United States Patent [19]
Capp et al.

[11] Patent Number: 5,495,234
[45] Date of Patent: Feb. 27, 1996

[54] METHOD AND APPARATUS FOR LENGTH DEPENDENT SELECTIVE CALL MESSAGE HANDLING

[75] Inventors: John K. Capp, Lighthouse Point; Gregory L. Cannon, Coconut Creek, both of Fla.

[73] Assignee: Motorola, Inc., Schaumburg, Ill.

[21] Appl. No.: 320,774

[22] Filed: Oct. 11, 1994

Related U.S. Application Data

[63] Continuation of Ser. No. 6,405, Jan. 21, 1993, abandoned.

[51] Int. Cl.⁶ .................................................. H04L 7/00
[52] U.S. Cl. ........................... 340/825.21; 340/825.44; 340/825.48; 345/56
[58] Field of Search ................... 340/825.21, 825.44, 340/825.48; 345/56

[56] References Cited

U.S. PATENT DOCUMENTS

| | | | |
|---|---|---|---|
| 4,336,524 | 6/1982 | Levine | 340/825.44 |
| 4,477,807 | 10/1984 | Nakajima et al. | 340/825.44 |
| 4,626,842 | 12/1986 | Ichikawa et al. | 340/825.44 |
| 4,646,081 | 2/1987 | Tsunoda | 340/825.44 |
| 4,684,935 | 8/1987 | Fujisaku et al. | 340/717 |
| 4,722,077 | 1/1988 | Jachmann et al. | |
| 4,766,434 | 8/1988 | Matai et al. | 340/825.44 |
| 4,857,915 | 8/1989 | Andros et al. | 340/825.44 |
| 4,860,339 | 8/1989 | D'Agosto, III et al. | |
| 4,872,005 | 10/1989 | De Luca et al. | 340/825.44 |
| 4,967,194 | 10/1990 | Haruki | 340/825.44 |
| 4,972,457 | 11/1990 | O'Sullivan | 379/59 |
| 5,043,721 | 8/1991 | May | 340/825.44 |
| 5,281,962 | 1/1994 | Vanden Heuvel et al. | 340/825.44 |

FOREIGN PATENT DOCUMENTS

| | | |
|---|---|---|
| 9013213 | 11/1990 | WIPO. |
| 9111889 | 8/1991 | WIPO. |

*Primary Examiner*—Donald J. Yusko
*Assistant Examiner*—Edward Merz
*Attorney, Agent, or Firm*—D. Andrew Floam

[57] ABSTRACT

A method in a communications receiver (20) for handling a selective call message comprises the steps of measuring a parameter of the selective call message (104, 116) and selecting whether to provide the selective call message to a display (118) or a communications port (106) in response to measuring the parameter of the selective call message (104, 116). The communications receiver (20) can function as either a pager or a radio frequency (RF) modem. A controller (66) determines the parameters of the message and operates the communications receiver (20) as a pager or as an RF modem in response to the parameters measured.

22 Claims, 3 Drawing Sheets

METHOD AND APPARATUS FOR LENGTH DEPENDENT SELECTIVE CALL MESSAGE HANDLING

This is a continuation of application Ser. No. 08/006,405, filed Jan. 21, 1993, now abandoned.

FIELD OF THE INVENTION

This invention relates in general to communications receivers, and in particular to a method and apparatus for message handling in selective call receivers.

BACKGROUND OF THE INVENTION

Communications receivers, such as selective call receivers, receive selective call signals and demodulate and decode the signals to derive selective call messages addressed to the receiver. To determine whether the selective call signal is directed to the receiver, the address of the message is correlated with one or more addresses assigned to the selective call receiver. When an address of the receiver is positively correlated, the message is decoded.

Typically, the selective call message types comprise numeric or alphanumeric information. The decoded message information is provided to a memory for storage and to a display driver for immediate display or user selectable display, the user being advised of the arrival of the message by activation of a user perceptible alert.

Recently, selective call message types have been expanded to include facsimile messages and graphic messages, in addition to lengthy alphanumeric messages. The display driver may not be able to handle the lengthy messages. Furthermore, in utilization of some selective call receivers, the longer alphanumeric messages or the graphic messages may be more appropriate for handling by a peripheral device than by the display drive of the selective call receiver.

Thus, what is needed is a message handling method and apparatus which can handle both normal selective call messages and lengthier selective call messages.

SUMMARY OF THE INVENTION

Accordingly, in one form, there is provided a method in a selective call receiver for handling a selective call message. The method comprises the steps of measuring a parameter of the selective call message and selecting whether to provide the selective call message to a display or a communications port in response to measuring the parameter of the selective call message.

In another form, there is provided a communications receiver for receiving a selective call signal. The communications receiver comprises receiver circuitry for receiving and demodulating the selective call signal to recover a message and a controller coupled to the receiver circuitry for determining parameters of the message, and wherein the controller operates the communications receiver either as a pager or as a radio frequency (RF) modem in response to the parameters measured.

DETAILED DESCRIPTION OF THE INVENTION

Figure 1:
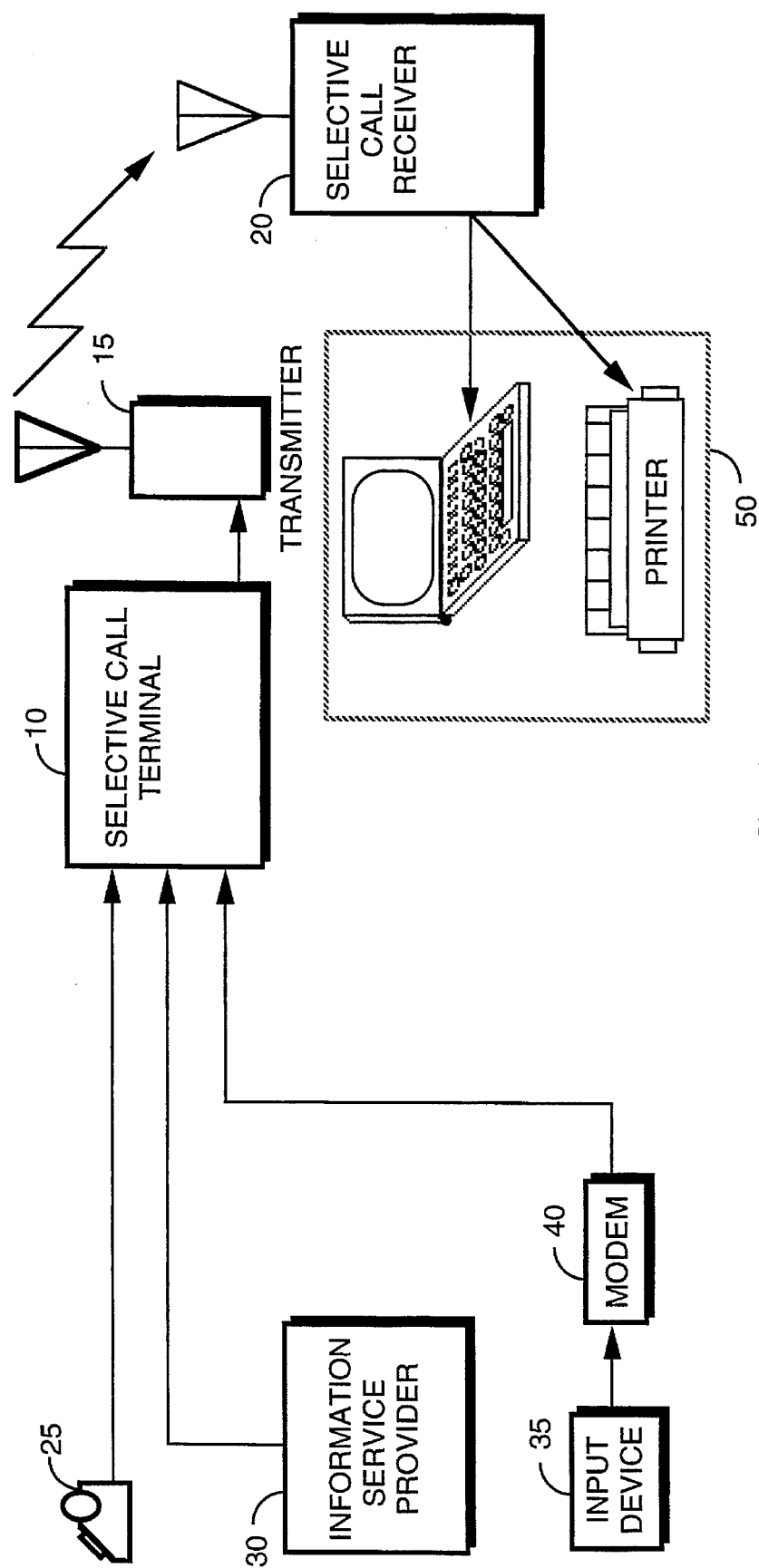
FIG. 1 is a block diagram of a selective call message system in accordance with the present invention.

Referring to FIG. 1, a selective call system, in accordance with the present invention, comprises a selective call terminal 10 which provides selective call signals to a transmitter 15 for transmission to at least one selective call receiver 20. The selective call signals are selective call messages which have been encoded into radio frequency (RF) signals by the selective call terminal 10.

The information comprising the selective call messages may be information received from a telephone 25 via the public switched telephone network. Additionally, the information may be received from an information service provider 30. The information service provider 30 collects information on sports, stocks, world finance, and other areas of interest to the public. Finally, the information may be received from another input device 35, e.g., a personal computer or electronic mail service, via a modem 40. The selective call terminal 10 encodes the information received from the telephone 25, the information service provider 30, or the modem 40 for transmission as selective call signals from the transmitter 15.

The selective call receiver 20 receives the selective call signal and decodes the signal to recover the selective call message. The selective call message can then be fed as data to an external electronic device 50 such as a laptop computer or other such computing device for utilization thereby. Additionally, or alternatively, the external electronic device could be a printer or facsimile machine for printing received messages.

Figure 2:
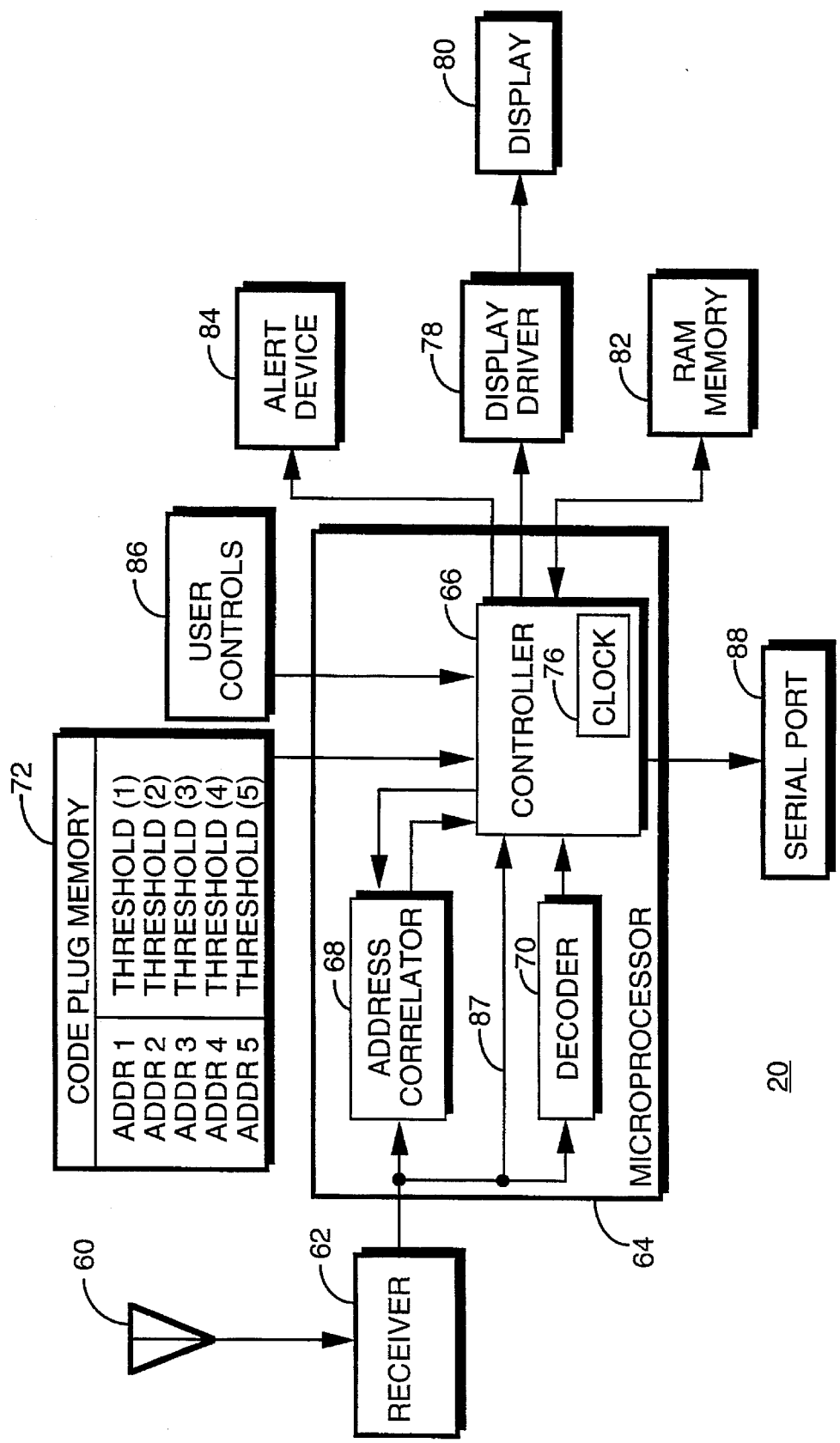
FIG. 2 is a block diagram of the selective call receiver of the selective call messaging system of FIG. 1 in accordance with the preferred embodiment of the present invention.

Referring to FIG. 2, the selective call receiver 20 receives the selective call signal via an antenna 60 for provision to receiver circuitry 62. The receiver circuitry 62 receives and demodulates the signal and provides the demodulated signal to a microprocessor 64.

The microprocessor 64 comprises a controller 66, an address correlator 68, and a decoder 70. The controller 66 controls the processing of the signal and other functions of the selective call receiver 20. The decoder 70 decodes the demodulated signal and provides the decoded signal to the controller 66.

The address correlator 68 is coupled to the controller for receiving addresses assigned to the selective call receiver 20 therefrom, the addresses stored in a code plug memory 72 and retrieved therefrom by the controller 66. The address correlator utilizes the addresses for examining the demodulated signal by attempting to correlate the addresses with the signal to determine whether one of the addresses is present therein. If one of the addresses assigned to the selective call receiver 20 is identified, the address correlator 68 signals the controller 66.

In accordance with a first aspect of the present invention, the code plug memory 72 stores a routing table comprising entries associated with each of the addresses assigned to the selective call receiver 20. The routing table shown in the code plug 72 comprises a message length threshold for each address. The routing table could comprise additional parameters associated with each address, such as message content or time of day information.

When a decoded message is received, the controller 66 determines the parameters of the message, such as the length of the message or the time the message was received. A real time clock 76 is implemented in the controller 66 for the purposes of determining the time of message receipt. Thereafter, the controller 66 handles the message in accordance with the address received with the message and the parameters of the message. In accordance with the preferred embodiment of the present invention, if the length of the decoded message is less than the message length threshold associated with the correlated address, the controller 66 provides the decoded message to a display driver 78 for presentation on a display 80 and to a random access memory (RAM) 82 for storage therein. The controller 66 also sends a signal to an alert device 84, such as an audible alert generator, a vibrator, or a visual alert generator, to activate a sensible message alert to advise a user that the message has been received and can be presented by activation of the user controls 86.

Additionally, in accordance with the preferred embodiment of the present invention, if the length of the decoded message is more than the message length threshold associated with the correlated address, the controller 66 provides the decoded message to a communications port 88, such as a serial port, for provision to the external electronic device 50 (FIG. 1), such as a printer or a laptop computer. The controller sends a signal to the alert device 84 to activate a sensible data alert to advise a user that a lengthy data message has been received and has been forwarded to the electronic device 50 via the serial port 88. Preferably, the data alert is different than the message alert, such as a short audible chirp to announce a data message and a longer audible alert to announce a selective call message. If the selective call receiver 20 is not coupled to an external device 50, the chirp reminds the user to couple the selective call receiver to, for example, a printer to print out a received message.

In accordance with a second aspect of the present invention, if the length of the decoded message is less than the message length threshold associated with the correlated address, the controller 66 provides the decoded message to both the display driver 78 for presentation on the display 80 and to the serial port 88 for provision to the external electronic device 50 (FIG. 1).

In accordance with another aspect of the present invention, the controller 66 examines the demodulated signal on line 87 to determine whether a protocol recognizable as a selective call signaling protocol is present. If a recognizable protocol is not present, the controller 66 provides the signal to the serial port 88 for provision to the external electronic device 50 (FIG. 1).

Figure 3:
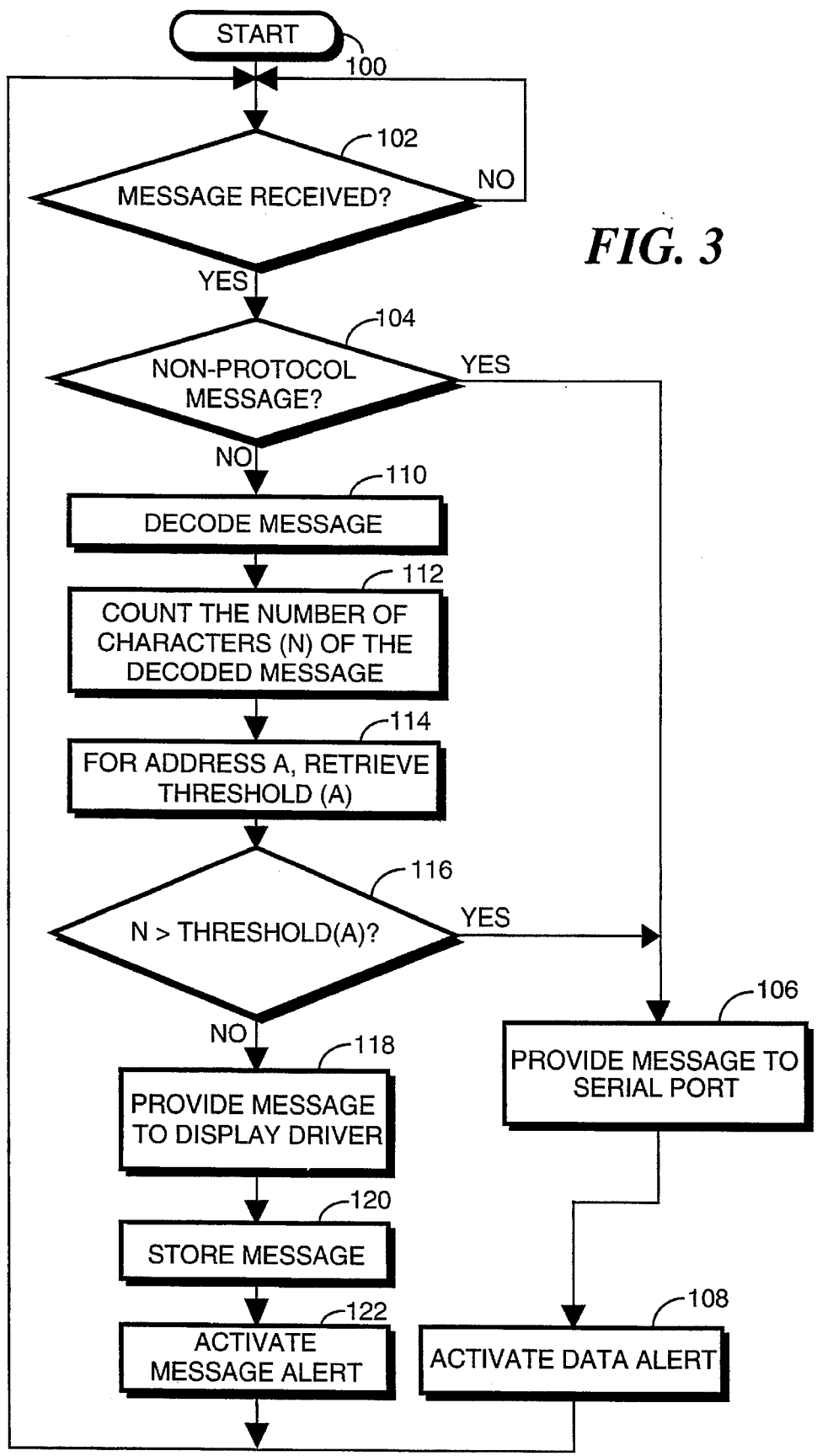
FIG. 3 is a flow chart of the operation of the controller of the selective call receiver of FIG. 2 in accordance with the preferred embodiment of the present invention.

Referring next to FIG. 3, a flow chart of the operation of the controller 66 after message reception is shown. After powering up 100 the selective call receiver, the message reception routine waits for receipt of a message 102. The controller 66 determines that a message is received when the address correlator 68 (FIG. 2) signals the controller 66 that an address assigned to the selective call receiver 20 is detected in the received and demodulated signal.

The controller 66 looks at the signal on line 87 (FIG. 2) to determine if the message is a non-protocol message 104, i.e., whether the protocol of the message is recognized as a protocol for which the decoder 70 (FIG. 2) is programmed to decode. If the message is a non-protocol message 104, the message is provided 106 to the serial port 88 and the alert device 84 (FIG. 2) is activated to present the data alert 108, such as the audible chirp described above. Processing then returns to await reception of a next message 102.

If the message has a recognizable protocol 104, the controller 66 examines the output of the decoder 70 to receive the decoded message 110, and the number of characters in the message, N, are counted 112. Additional parameters of the received message could also be measured at step 112. For example, the controller 66 could determine the time of day that the message is received by reading the output of the real time clock 76 (FIG. 2) when the signal from the address correlator 68 indicating message receipt is received.

Next, the controller 66 retrieves 114 the information to determine the message length threshold (THRESHOLD (A)) in response to the address correlated (ADDRESS A). The routing table stored in the code plug 72 (FIG. 2) associates various message parameters with the address. One of the parameters is message length threshold. Other parameters could be stored in the code plug and those parameters would be retrieved at step 114. The parameter measurement taken at step 112 is compared to the parameter retrieved from the routing table at step 114 to determine whether the measured parameter is outside the established parameters stored 116. For example, the length of the message, N, is compared to the message length threshold (THRESHOLD(A)) 116.

If the length N is greater than the message length threshold 116 (i.e., the message length is outside the stored parameter), the decoded message is provided 106 to the serial port 88 (FIG. 2) for provision to the external electronic device 50 (FIG. 1), and the data alert is activated 108. Processing then returns to await reception of a next message 102.

If the length N is not greater than the message length threshold 116 (i.e., the message length is within the stored parameter), the decoded message is provided 118 to the display driver 78 (FIG. 2) and stored 120 in the RAM 82 (FIG. 2). The distinctive selective call message alert is activated 122 to notify the user that a selective call message is received. The order of the steps is not important; the decoded message is treated as a selective call message and handled in accordance with conventional selective call message handling techniques.

Alternatively, in accordance with the second aspect of the present invention, if the length N is not greater than the message length threshold 116, the decoded message may be provided 118 to the display driver 78 and the serial communications port 88 (FIG. 2).

After the alert is activated 122, processing returns to await reception of a next message 102.

Thus it can be seen that selective call message handling in accordance with the present invention allows a selective call receiver 20 to act as a conventional pager or as a radio frequency (RF) modem. The selection of RE modem or pager operation is made automatically in response to measured parameters of a received message and stored parameters. The stored parameters may be individualized to particular addresses. Thus, in operation, a user may program the code plug 72 to treat messages received on individual addresses as selective call messages unless they are too long for easy presentation on the display 80 (FIG. 2). The selective call receiver 20 could be coupled to a printer and messages received on the individual address exceeding the stored message length would be printed on the printer.

Likewise, certain information services addresses could have time parameters stored in the routing table. At the end of the work day, the user could couple the selective call receiver 20 to a computing device 50. The selective call receiver 20 would act as an RF modem and any messages received on the indicated addresses after work (i.e., the addresses having, for example, "5:00" stored therewith) would be stored in the computing device 50.

In accordance with the second aspect of the present invention, an RF modem receives and decodes selective call messages and provides those messages to an external electronic device 50. Additionally, if the length of the received selective call message is short enough to be accommodated on the display of the RF modem, the message is also displayed.

By now it should be appreciated that there has been provided a message handling method and apparatus which can handle both normal selective call messages and lengthier selective call messages.

We claim:

1. A selective call receiver for receiving a selective call signal comprising a message, the selective call receiver comprising:

receiver circuitry for receiving and demodulating the selective call signal;

a display;

a communications port for coupling the selective call receiver to an external electronic device; and a controller coupled to the receiver circuitry for detecting message parameters in the selective call signal, the message parameters comprising a length of the message;

wherein the controller is coupled to the display and the communications port for providing the message thereto, and wherein the controller selects to provide the message to the display or the communications port depending on the length of the message detected in the selective call signal.

2. The selective call receiver of claim 1 wherein the controller selects to provide the message to the communications port in response to determining the length of the message is greater than a predetermined threshold length.

3. The selective call receiver of claim 1 wherein the controller selects to provide the message to the display in response to determining the length of the message is less than a predetermined threshold length.

4. The selective call receiver of claim 1 wherein the controller selects to provide the message to both the communications port and the display in response to determining the length of the message is less than a predetermined threshold length.

5. The selective call receiver of claim 1 wherein the selective call receiver further comprises:

a memory for storing at least one address assigned to the selective call receiver; and an address correlator coupled to the memory and the receiver circuitry for correlating the demodulated selective call signal with the at least one address to determine whether one of the at least one address is present in the demodulated selective call signal, and wherein the controller selects to provide the message to the display in response to determining the length of the message is less than a selected message length if the address correlator determines that one of the at least one address is present in the demodulated selective call signal, the selected message length determined in response to the one of the at least one address.

6. A selective call receiver for receiving a selective call signal comprising a message, the selective call receiver comprising:

receiver circuitry for receiving and demodulating the selective call signal;

a display;

a communications port for coupling the selective call receiver to an external electronic device; and a controller coupled to the receiver circuitry for detecting message parameters in the selective call signal, the message parameters comprising a protocol utilized for transmitting the message;

wherein the controller is coupled to the display and the communications port for providing the message thereto, and wherein the controller selects to provide the message to the communications port in response to determining the protocol is not a conventional paging protocol.

7. A selective call receiver for receiving a selective call signal comprising a message, the selective call receiver comprising:

receiver circuitry for receiving and demodulating the selective call signal;

a display;

a communications port for coupling the selective call receiver to an external electronic device;

a controller coupled to the receiver circuitry for detecting message parameters in the selective call signal;

a memory for storing at least one address assigned to the selective call receiver; and an address correlator coupled to the memory and the receiver circuitry for correlating the demodulated selective call signal with the at least one address to determine whether one of the at least one address is present in the demodulated selective call signal, and wherein the controller selects to provide the message to the communications port or to the display if the address correlator determines that one of the at least one address is present in the demodulated selective call signal and in response to the one of the at least one address and the message parameters.

8. The selective call receiver of claim 7 wherein the memory comprises a routing table memory for storing the at least one address and at least one predetermined message parameter associated with each of the at least one address, and wherein the controller selects to provide the message to the communications port if the address correlator determines that one of the at least one address is present in the demodulated selective call signal and in response to determining whether the message parameters are outside one of the at least one predetermined message parameter associated with the one of the at least one address.

9. The selective call receiver of claim 7 wherein the memory comprises a routing table memory for storing the at least one address and at least one predetermined message parameter associated with each of the at least one address, and wherein the controller selects to provide the message to the display if the address correlator determines that one of the at least one address is present in the demodulated selective call signal and in response to determining whether the message parameters are within one of the at least one predetermined message parameter associated with the one of the at least one address.

10. A method in a selective call receiver for handling a selective call message comprising the steps of:

detecting message parameters of a selective call message received by the selective call receiver;

comparing the message parameters to predetermined information, the predetermined information defining a predetermined message parameter; and selecting to provide the selective call message to the display if the message parameters are inside the predetermined message parameter.

11. A method in a selective call receiver for handling a selective call message comprising the steps of:

detecting message parameters in the selective call message received by the selective call receiver;

comparing the message parameters to predetermined information, the predetermined information defining a predetermined message parameter; and selecting to provide the selective call message to the communications port if the message parameters are outside the predetermined message parameter.

12. A communications receiver for receiving a selective call signal comprising:

receiver circuitry for receiving and demodulating the selective call signal to recover a message; and a controller coupled to the receiver circuitry, wherein the controller determines message parameters comprising a length of the message;

wherein the controller operates the communications receiver as a pager or as a radio frequency (RF) modem depending on the length of the message detected.

13. The communications receiver of claim 12, wherein the controller operates the communications receiver as the RF modem in response to determining the length of the message is greater than a predetermined threshold length.

14. The communications receiver of claim 12, wherein the controller operates the communications receiver as the pager in response to determining the length of the message is less than a predetermined threshold length.

15. The communications receiver of claim 12, wherein the controller selects to operate the communications receiver as both a pager and a RF modem in response to determining the length of the message is less than a predetermined threshold length.

16. A communications receiver for receiving a selective call signal comprising:

receiver circuitry for receiving and demodulating the selective call signal to recover a message; and a controller coupled to the receiver circuitry, wherein the controller determines message parameters of the message comprising a time at which the message is received; and wherein the controller operates the communications receiver as a pager or as a radio frequency (RF) modem in response to the time at which the message is received.

17. A communications receiver for receiving a selective call signal comprising;

receiver circuitry for receiving and demodulating the selective call signal to recover a message; and a controller coupled to the receiver circuitry, wherein the controller determines message parameters of the message;

a memory for storing at least one address assigned to the communications receiver; and an address correlator coupled to the memory and the receiver circuitry for correlating the demodulated selective call signal with the at least one address to determine whether one of the at least one address is present in the demodulated selective call signal, and wherein the controller operates the communications receiver either as a pager or as a radio frequency (RF) modem if the address correlator determines that one of the at least one address is present in the demodulated selective call signal and in response to the one of the at least one address and the message parameters.

18. The communications receiver of claim 17 wherein the memory comprises a routing table memory for storing the at least one address and at least one predetermined message parameter associated with each of the at least one address, and wherein the controller operates the communications receiver as the RF modem if the address correlator determines that one of the at least one address is present in the demodulated selective call signal and in response to determining whether the message parameters are outside one of the at least one predetermined message parameter associated with the one of the at least one address.

19. The communications receiver of claim 17 wherein the memory comprises a routing table memory for storing the at least one address and at least one predetermined message parameter associated with each of the at least one address, and wherein the controller operates the communications receiver as the pager if the address correlator determines that one of the at least one address is present in the demodulated selective call signal and in response to determining whether the message parameters are inside one of the at least one predetermined message parameter associated with the one of the at least one address.

20. A selective call receiver for receiving a selective call signal comprising a message, the selective call receiver comprising:

receiver circuitry for receiving and demodulating the selective call signal;

a display;

a communications port for coupling the selective call receiver to an external electronic device; and a controller coupled to the receiver circuitry for detecting message parameters in the selective call signal, the message parameters comprising a time at which the message is received;

wherein the controller is coupled to the display and the communications port for providing the message thereto, and wherein the controller selects to provide the message to the display or the communications port in response to the message parameters detected in the selective call signal.

21. The selective call receiver of claim 20 wherein the controller selects to provide the message to the communications port in response to determining the time at which the message is received is later than a predetermined time of day.

22. The selective call receiver of claim 20 wherein the controller selects to provide the message to the display in response to determining the time at which the message is received is earlier than a predetermined time of day.

* * * * *